April 8, 1958     F. W. SWAMER     2,830,101
PREPARATION OF 1,1-DIFLUOROETHANE
Filed May 11, 1956
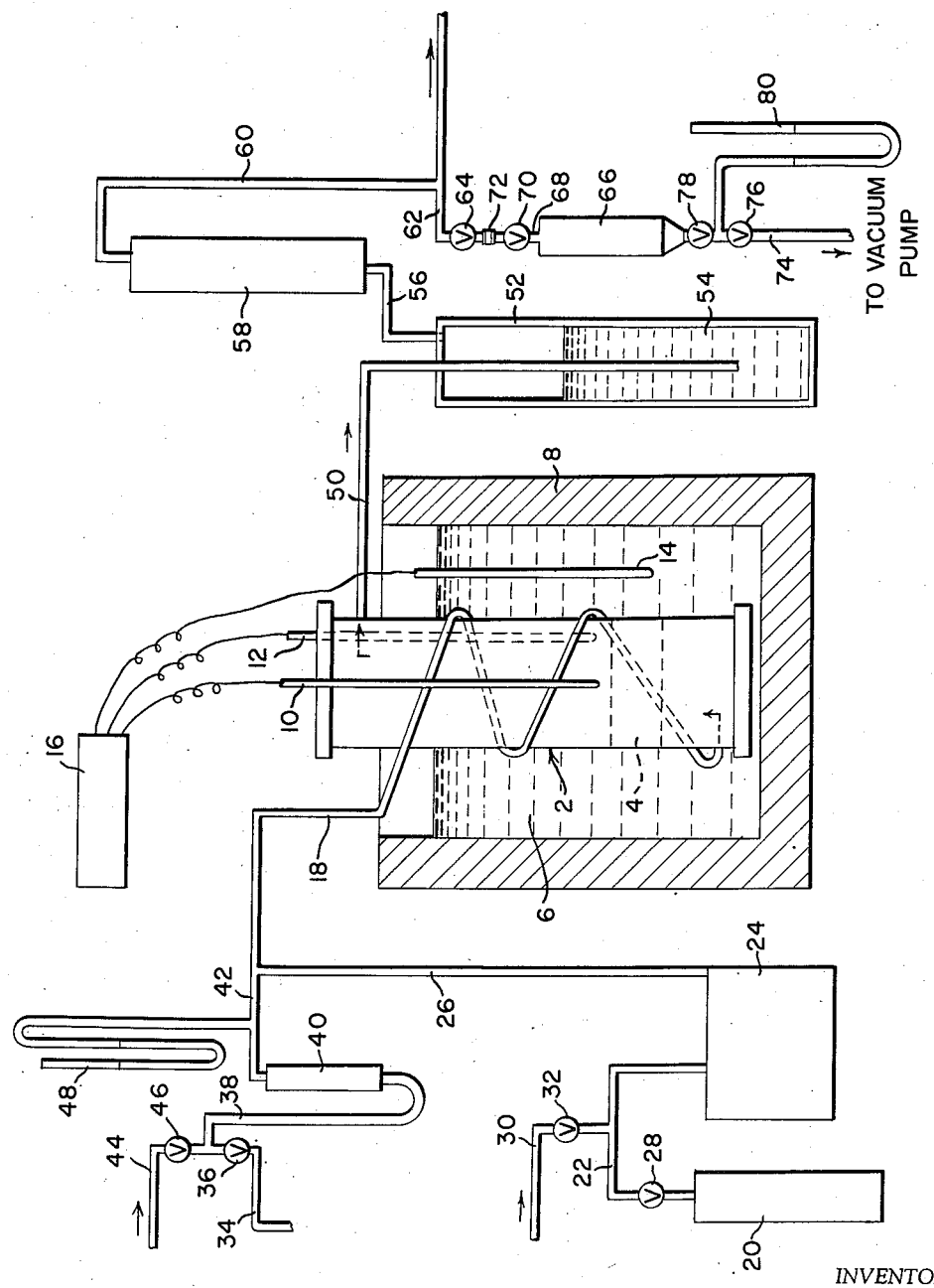
INVENTOR
FREDERIC W. SWAMER
BY *Edwin C. Woodhouse*
ATTORNEY

United States Patent Office 2,830,101
Patented Apr. 8, 1958

2,830,101

PREPARATION OF 1,1-DIFLUOROETHANE

Frederic W. Swamer, Boothwyn, Pa., assignor to E. I. du Pont de Nemours and Company, Wilmington, Del., a corporation of Delaware Application May 11, 1956, Serial No. 584,388

11 Claims. (Cl. 260—653)

This invention relates to the preparation of 1,1-difluoroethane, and more particularly to an improved process for its preparation by the vapor phase reaction of hydrogen fluoride with acetylene in the presence of a novel catalyst for the reaction.

It is known that 1,1-difluoroethane is valuable as a refrigerant, as a solvent, and particularly as an intermediate for the production of vinyl fluoride which is known to be a valuable polymerizable material. Vinyl fluoride can be readily prepared by passing 1,1-difluoroethane over a heated catalyst bed, such as aluminum sulfate, to split off HF. When carrying out this dehydrofluorination process, it has been found that as little as 1% of vinyl fluoride in the 1,1-difluoroethane materially shortens the life of the catalyst and thus renders the dehydrofluorination process inefficient.

It has long been known that 1,1-difluoroethane can be prepared by the reaction of acetylene with hydrogen fluoride (HF), usually in the presence of a catalyst. In most cases, vinyl fluoride is simultaneously produced in material proportions, frequently equal to or exceeding the amounts of 1,1-difluoroethane. Such mixtures require costly separation steps in order to obtain the 1,1-difluoroethane sufficiently pure for most purposes, including efficient use in the process for its conversion to vinyl fluoride. Also, when it is attempted to carry out the reaction in the vapor phase, such catalysts generally require high temperatures, have short catalyst lives, and frequently are quite costly. These features materially increase the cost of the process and of the product.

It is an object of this invention to provide a novel process for producing 1,1-difluoroethane by the vapor phase reaction of acetylene and hydrogen fluoride. Another object is to provide such a process wherein the reaction is caused to take place at low temperatures in the presence of a novel catalyst which is efficient at low temperatures. A further object is to provide such a process wherein 1,1-difluoroethane is produced as the predominant product and vinyl fluoride is produced in a small proportion, less than 1% by weight based on the 1,1-difluoroethane. Still another object is to provide a process of the character aforesaid which is simple and economical and is readily operated and controlled. Other objects will appear hereinafter.

The above and other objects may be accomplished according to this invention which comprises contacting a mixture of substantially pure gaseous hydrogen fluoride and gaseous acetylene free of catalyst poisons in a ratio of from about 1.5 to about 3 moles of hydrogen fluoride to each mole of acetylene with a porous carbon supported metal halide catalyst at a temperature of from about 25° C. to about 75° C. and under a pressure below the condensation pressure of hydrogen fluoride at that temperature, said catalyst being the product obtained by distributing an anhydrous metal chloride of the group consisting of stannic chloride and titanium tetrachloride on a porous carbon support in a proportion equal to from about 10% to about 40% by weight of metal based on the carbon support and treating the supported metal chloride with substantially pure hydrogen fluoride at a temperature of from about 0° C. to about 75° C.

It has been found that by such process, 1,1-difluoroethane is obtained efficiently in excellent yields, contains less than 1% by weight of vinyl fluoride, and requires a minimum of after treatment to obtain 1,1-difluoroethane in sufficiently pure form for most purposes. The catalyst is not volatile, is unusually effective at the low temperatures employed, is inexpensive, and does not require recovery. These factors, together with the low or moderate temperatures and pressures employed, contribute to the economy of the process, resulting in a very inexpensive process and the production of 1,1-difluoroethane at low cost.

One type of apparatus, suitable for carrying out the process of this invention, is illustrated diagrammatically in the accompanying drawing, in which a vertical, cylindrical, stainless steel reactor 2 is packed part way with the supported catalyst to form a catalyst chamber 4. The reactor is set in a constant temperature bath 6 in a suitable container 8. The reactor and the bath are provided with conventional temperature controlling and measuring means, such as a potentiometer 16 connected with heating elements 10 and 12 which extend into the bath and with a thermocouple 14 which is below the surface of the bath. A gas supply line 18, which conveniently may be coiled about the reactor as shown, leads into the bottom of the reactor. An anhydrous hydrogen fluoride supply 20 is connected to line 18 through a valved line 22, a flowmeter 24 and a line 26, the valve in line 22 being shown at 28. A nitrogen supply line 30, provided with a valve 32, also leads into line 22 between the valve 28 and the flowmeter 24. An acetylene supply line 34, provided with a valve 36, is also connected to line 18, at the point of intersection of line 26 with line 18, through line 38, rotameter 40 and line 42. A nitrogen supply line 44, provided with a valve 46, also leads into line 38. The line 42 is provided with a manometer 48 to measure the pressure of the system upstream of the reactor.

An exit line 50, for the effluent gases, leads from the top of the reactor 2 to near the bottom of a vessel 52 which contains a supply 54 of aqueous caustic, such as a 4% aqueous solution of sodium hydroxide or a 10% aqueous solution of potassium hydroxide. A line 56 leads from the top of the vessel 52 to the bottom of a column 58 which contains a drying agent. A line 60 leads from the top of the column 58 to a system (not shown) for separating the 1,1-difluoroethane from any unreacted acetylene or any nitrogen that may be present therein, in a conventional manner.

For the purpose of taking samples of the gases flowing from the column 58, a sampling line 62, provided with a valve 64, is connected with the line 60. A gas sample tube 66 has a short inlet pipe 68, provided with a valve 70. The end of the pipe 68 is detachably connected with the end of the sampling line 62 by a coupling 72 of conventional construction. The lower end of the sampling tube is provided with a vacuum line 74 which leads to a vacuum pump (not shown). The line 74 has two spaced valves 76 and 78 and a manometer 80 connected into it between the valves.

In operation, the system is purged with dry nitrogen from lines 30 and 44 to ensure that the system is free of moisture. Then the supported catalyst is charged into the reactor tube 2 under a nitrogen atmosphere to form a bed of catalyst in the catalyst chamber. Alternatively, the catalyst may be formed in the catalyst chamber by charging the dried porous carbon support therein under nitrogen, distilling the metal tetrachloride onto the support, and then passing substantially pure gaseous hydrogen fluoride from the supply 20 through the supported metal tetrachloride for at least about 30 minutes. Then substantially pure gaseous hydrogen fluoride from the supply 20 and acetylene free of catalyst poisons from line 34 in the required proportion are forced into the system through line 18 in which they become mixed and the mixture flows into the reactor where it contacts the catalyst and reacts to form 1,1-difluoroethane. If desired, the hydrogen fluoride, the acetylene or both, may be diluted with nitrogen from line 30 and/or line 44, but generally this is not desirable because the nitrogen appears in the product from which it must be separated. Accordingly, the flow of nitrogen into the system normally is stopped before the hydrogen fluoride and the acetylene are introduced. During the reaction, the temperature of the bath 6 may be controlled to maintain the reaction temperature in the reactor within the desired range.

The gaseous reaction mixture passes out of the reactor through line 50 into vessel 52 where it is scrubbed with aqueous caustic to remove any unreacted hydrogen fluoride and then through column 58 where it is dried. The scrubbed and dried reaction mixture then passes through line 60 to a system for separating unreacted acetylene and nitrogen (when present) from the 1,1-difluoroethane by well-known conventional methods, such as condensation of the 1,1-difluoroethane from the mixture, adsorption or absorption of the acetylene on or in a suitable medium, and the like.

When it is desired to take a sample of the gases flowing from the column 58 for analysis, valves 76 and 78 will be opened, while maintaining valves 64 and 70 closed, and vacuum will be applied to line 74 to evacuate the sample tube 66. Then valve 76 is closed and valves 64 and 70 are opened slowly and carefully so as to prevent any pressure change in the reactor and the scrubber systems. When the taking of the sample is completed, as shown by the manometer 80, valves 64 and 70 are closed and the sample tube is disconnected from line 62 and taken for analysis of the sample therein.

Porous carbon supports for catalysts are well-known and any of them may be used. Normally, the support will be charcoal, preferably an activated charcoal obtained from vegetable or animal sources. The activated charcoals are well-known in commerce. They are obtained by carbonizing vegetable or animal matter, such as coconut shells, fruit pits, wood, bones, etc., and then subjecting the charcoal to an activating treatment, as with steam or hot air. Some suitable well-known activated charcoals are available under the trade names "Nuchar," "Norit," "Darco," and "Columbia 4AC."

The method of distributing the metal tetrachloride on the porous carbon support is quite simple. The support is dried carefully and the liquid metal tetrachloride is poured or distilled directly onto the support. The operation should be carried out in an atmosphere of an inert gas, such as nitrogen, helium, argon, and the like. The amount of metal tetrachloride on the support should be that which equals from about 10% to about 40% by weight of metal (tin or titanium) based on the weight of the support. Amounts of metal tetrachloride equal to materially less than 10% by weight of metal, while operable, are not desirable as they fail to give practical conversions. Concentrations as high as 40% by weight of metal have been used satisfactorily. Preferably, the support will contain from about 15% to about 25% by weight of metal.

The supported metal tetrachloride must be treated with substantially pure hydrogen fluoride to produce the active catalyst for this process. During such treatment, part of the chlorine is replaced by fluoride, apparently to produce complex mixtures of metal chloride, metal fluoride, and metal chlorofluorides, the exact composition of the active catalyst being unknown. This conversion of the metal tetrachloride to the active catalyst is accomplished by treating the metal tetrachloride on the support with substantially pure hydrogen fluoride for a period of about 30 minutes or more, usually up to about 4 hours, at temperatures of from about 0° C. to about 75° C., preferably at from about 15° C. to about 50° C. and most conveniently at about room temperature. Excessive periods of treatment are not harmful to the catalyst, but are wasteful. Usually, this is done by passing the hydrogen fluoride in the gaseous state over the supported metal tetrachloride. Alternatively, the supported metal tetrachloride may be submerged in substantially pure, liquid hydrogen fluoride for the required period of time with agitation, while maintaining the mixture under pressure sufficient to maintain the hydrogen fluoride in the liquid state, and then removing the excess hydrogen fluoride from the catalyst mass by evaporation, decantation filtration, or the like. If a mixture of acetylene free of catalyst poisons and substantially pure gaseous hydrogen fluoride is passed over the supported metal tetrachloride under the conditions of this invention, the metal tetrachloride will be gradually converted to the active catalyst, but acetylene, time, and labor will be wasted pending the formation of sufficient active catalyst to obtain efficient reaction to form 1,1-difluoroethane. On the other hand, if the supported metal tetrachloride is first treated with hydrogen fluoride in accord with this invention, reaction to form 1,1-difluoroethane containing less than 1% of vinyl fluoride proceeds immediately at a rapid rate when the catalyst is contacted with the gaseous mixture of acetylene and hydrogen fluoride under the conditions of this invention.

Water, sulfur dioxide and acetone are catalyst poisons for the catalysts of this invention. If significant amounts of these catalyst poisons are present, they will rapidly render the catalyst ineffective. Therefore, it is essential that the metal tetrachloride be anyhdrous and that the acetylene be free of water and acetone. Acetylene is frequently dissolved in acetone for storage, but is readily freed therefrom by fractionation, scrubbing with aqueous bisulfite, and drying. Neither the metal tetrachloride nor the acetylene ordinarily contain sulfur dioxide. However, crude hydrogen fluoride frequently contains significant amounts of both water and sulfur dioxide. Accordingly, the hydrogen fluoride used in this process must be substantially pure, that is, it must contain less than 0.01% by weight of water and less than 0.1% by weight of sulfur dioxide. Hydrogen fluoride of the required purity can be readily obtained by distilling commercial hydrogen fluoride.

If desired, the gaseous acetylene and/or the hydrogen fluoride may be diluted with an inert gas, such as nitrogen, helium, neon, argon, and the like, which has a boiling point materially different from that of the 1,1-difluoroethane so that it can be readily separated therefrom, as by distillation. Usually, such inert gas is not preferred.

The ratio of hydrogen fluoride to acetylene, in the gaseous mixture that is contacted with the catalyst, should be in the range of from about 1.5 to about 3 moles of hydrogen fluoride to each mole of acetylene. When the ratio of hydrogen fluoride is materially below 1.5 moles, large amounts of excess acetylene appear in the product and hence are wasted. Materially more than 3 moles of hydrogen fluoride to each mole of acetylene is similarly wasteful of hydrogen fluoride. Variation in the ratio of hydrogen fluoride to acetylene, does not appear to significantly affect the proportion of vinyl fluoride produced, even when the ratio of hydrogen fluoride is decreased to 0.8 mole.

The reaction between the hydrogen fluoride and the acetylene should be carried out at a temperature of from about 25° C. to about 75° C., preferably from about 25° C. to about 50° C., and under a pressure below the condensation pressure of hydrogen fluoride at the temperature employed, preferably at about atmospheric pressure. At temperatures materially above 75° C., the conversion drops off quickly and the process becomes impractical. Most desirably, the reaction is started at about room temperature, and the temperature will increase as the reaction proceeds, but usually not above 50° C. in the absence of external heating.

In order to more clearly illustrate this invention, preferred modes of carrying it into effect, and the advantageous results to be obtained thereby, the following examples are given wherein the parts are by weight except where specifically stated otherwise:

Example 1

"Norit" active charcoal (8 to 20 mesh) was dried at 110° C. for 24 hours. Approximately 100 cc. of the dried charcoal was charged to a 500 ml. flask which was connected as a receiver to a short distilling column. The system was urged with nitrogen at room temperature. Then 50 ml. of titanium tetrachloride was distilled directly onto the charcoal and distributed evenly over it. The amount of titanium, in the titanium tetrachloride on the charcoal, was about 15% by weight. The charcoal with the titanium tetrachloride deposited on it was then cooled under nitrogen and the whole mass quickly poured into a nitrogen purged 500 ml. polyethylene bottle. The bottle was closed with a rubber stopper containing stainless steel ¼ inch inlet and outlet tubes, the inlet tube extending nearly to the bottom of the bottle. Substantially pure, gaseous hydrogen fluoride was passed through the titanium tetrachloride soaked charcoal at room temperature for 30 minutes with occasional shaking to insure good contact.

26 grams of the catalyst, prepared as described above, were charged under nitrogen to the stainless steel reactor 2 of the drawing. Substantially pure gaseous hydrogen fluoride and gaseous acetylene free of catalyst poisons were metered into the reactor at room temperature and at about atmospheric pressure. The reaction started spontaneously, and, after a few moments, the heat of reaction raised the catalyst bed temperature to 35° C. The acetylene flow rate was 50 cc. per minute (3.12 g./hr.) and the HF feed rate 4.2 g. per hour. (This corresponds to an HF to acetylene ratio of 1.75:1.0.) The exit gases were scrubbed with a 4% sodium hydroxide solution and samples taken at intervals for mass spectrometer analyses. After 1½ hours operation, 3 gas samples were taken at 20 minute intervals. Analyses are tabulated below.

|  | Sample No. | | |
| --- | --- | --- | --- |
|  | 1 | 2 | 3 |
| Reaction Time (Hrs.) | 1.5 | 1.8 | 2.1 |
| Percent 1,1-Difluoroethane | 39.3 | 41.4 | 42.4 |
| Percent Vinyl Fluoride | 0.3 | 0.3 | 0.3 |
| Percent Acetylene | 60.4 | 58.3 | 57.4 |

Example 2

A catalyst was prepared on "Norit" activated charcoal as described in Example 1 except that stannic chloride was deposited on the porous carbon while in the reactor of the drawing, cooled to room temperature, and then treated with substantially pure gaseous HF for about 3.75 hours, the temperature increasing to 30° C. The amount of tin, in the stannic chloride on the charcoal, was 22.5% by weight. Gaseous acetylene free of catalyst poisons was then fed into the reaction tube at 40 cc. per minute (2.6 g./hr.) and substantially pure gaseous HF was fed into the tube at the rate of 5.4 g. per hour both at about atmospheric pressure. The mole ratio of HF to acetylene was 2.7:1.0. There was no indication of a temperature rise, but 1,1-difluoroethane was formed in the exit gases. After 1.5 hours operation, a sample was taken. The temperature of the catalyst bed was raised to 50° C., and additional samples were collected after further reaction. Analyses of the samples are shown below.

|  | Sample No. | | |
| --- | --- | --- | --- |
|  | 1 | 2 | 3 |
| Reaction Temp., ° C | 20-25 | 50 | 50 |
| Reaction Time (Hrs.) | 1.5 | 2.75 | 3.5 |
| Percent 1,1-Difluoroethane | 17.5 | 19.4 | 11.4 |
| Percent Vinyl Fluoride | 0.1 | 0.1 | 0.2 |

It will be understood that the apparatus shown in the drawings and hereinbefore described is merely illustrative of one of the types of apparatus that can be used in practicing this invention, and that it can be widely modified and varied. Also, other types of apparatus, suitable for carrying out the process will be apparent to those skilled in the art. Furthermore, it will be understood that the examples of this invention, hereinbefore described, are given for illustrative purposes solely, and that many modifications can be made therein within the scope of the general disclosure, such as in the concentration of the catalyst on the support, the method of preparing the catalyst, the ratios of hydrogen fluoride to acetylene and their rates of flow, the temperatures and pressures, and the techniques employed, without departing from the spirit or scope of this invention.

From the preceding description, it will be apparent that this invention provides a novel process for producing 1,1-difluoroethane, employing a novel advantageous catalyst under novel and advantageous conditions, whereby the 1,1-difluoroethane is produced in high yields and in a high state of purity. The catalyst is cheap, highly efficient, has a long catalyst life and a high catalyst yield, and is not volatile under the conditions of use. The process is simple, efficient, easy to operate and control, and exceptionally economical. Therefore, it is apparent that this invention constitutes a valuable advance in and contribution to the art.

The embodiments of the invention in which an exclusive property or privilege is claimed are defined as follows:

I claim:

1. The process for making 1,1-difluoroethane which comprises distributing an anyhydrous metal chloride of the group consisting of stannic chloride and titanium tetrachloride on a porous carbon support in a proportion equal to from about 10% to about 40% by weight of metal based on the carbon support, treating the supported metal chloride with substantially pure hydrogen fluoride for at least about 30 minutes at a temperature of from about 25° C. to about 50° C., then contacting with the resulting supported catalyst a mixture of substantially pure gaseous hydrogen fluoride and gaseous acetylene free of catalyst poisons in a ratio of from about 1.5 to about 3 moles of hydrogen fluoride to each mole of acetylene at a temperature of from about 25° C. to about 50° C. and under a pressure below the condensation pressure of hydrogen fluoride at that temperature.

2. The process for making 1,1-difluoroethane which comprises distributing an anhydrous metal chloride of the group consisting of stannic chloride and titanium tetrachloride on a porous activated charcoal in a proportion equal to from about 15% to about 25% by weight of metal based on the charcoal, treating the supported metal chloride with substantially pure hydrogen fluoride for at least about 30 minutes at a temperature of from about 0° C. to about 75° C., then contacting with the resulting supported catalyst a mixture of substantially pure gaseous hydrogen fluoride and gaseous acetylene free of catalyst poisons in a ratio of from about 1.5 to about 3 moles of hydrogen fluoride to each mole of acetylene at a temperature of from about 25° C. to about 50° C. and under a pressure below the condensation pressure of hydrogen fluoride at that temperature.

3. The process for making 1,1-difluoroethane which comprises contacting a mixture of substantially pure gaseous hydrogen fluoride and gaseous acetylene free of catalyst poisons in a ratio of from about 1.5 to about 3 moles of hydrogen fluoride to each mole of acetylene with a porous carbon supported metal halide catalyst at a temperature of from about 25° C. to about 75° C. and under a pressure below the condensation pressure of hydrogen fluoride at that temperature, said catalyst being the product obtained by distributing an anhydrous metal chloride of the group consisting of stannic chloride and titanium tetrachloride on a porous carbon support in a proportion equal to from about 10% to about 40% by weight of metal based on the carbon support and treating the supported metal chloride with substantially pure hydrogen fluoride at a temperature of from about 0° C. to about 75° C.

4. The process for making 1,1-difluoroethane which comprises contacting a mixture of substantially pure gaseous hydrogen fluoride and gaseous acetylene free of catalyst poisons in a ratio of from about 1.5 to about 3 moles of hydrogen fluoride to each mole of acetylene with a porous carbon supported metal halide catalyst at a temperature of from about 25° C. to about 50° C. and under a pressure below the condensation pressure of hydrogen fluoride at that temperature, said catalyst being the product obtained by distributing an anhydrous metal chloride of the group consisting of stannic chloride and titanium tetrachloride on a porous carbon support in a proportion equal to from about 10% to about 40% by weight of metal based on the carbon support and treating the supported metal chloride with substantially pure hydrogen fluoride for at least about 30 minutes at a temperature of from about 0° C. to about 75°C.

5. The process for making 1,1-difluoroethane which comprises contacting a mixture of substantially pure gaseous hydrogen fluoride and gaseous acetylene free of catalyst poisons in a ratio of from about 1.5 to about 3 moles of hydrogen fluoride to each mole of acetylene with a porous carbon supported metal halide catalyst at a temperature of from about 25° C. to about 75° C. and under a pressure below the condensation pressure of hydrogen fluoride at that temperature, said catalyst being the product obtained by distributing an anhydrous metal chloride of the group consisting of stannic chloride and titanium tetrachloride on a porous carbon support in a proportion equal to from about 15% to about 25% by weight of metal based on the carbon support and treating the supported metal chloride with substantially pure hydrogen fluoride for at least about 30 minutes at a temperature of from about 0° C. to about 75° C.

6. The process for making 1,1-difluoroethane which comprises contacting a mixture of substantially pure gaseous hydrogen fluoride and gaseous acetylene free of catalyst poisons in a ratio of from about 1.5 to about 3 moles of hydrogen fluoride to each mole of acetylene with a porous carbon supported metal halide catalyst at a temperature of from about 25° C. to about 50° C. and under a pressure below the condensation pressure of hydrogen fluoride at that temperature, said catalyst being the product obtained by distributing an anhydrous metal chloride of the group consisting of stannic chloride and titanium tetrachloride on a porous carbon support in a proportion equal to from about 15% to about 25% by weight of metal based on the carbon support and treating the supported metal chloride with substantially pure hydrogen fluoride for at least about 30 minutes at a temperature of from about 0° C. to about 75° C.

7. The process for making 1,1-difluoroethane which comprises contacting a mixture of substantially pure gaseous hydrogen fluoride and gaseous acetylene free of catalyst poisons in a ratio of from about 1.5 to about 3 moles of hydrogen fluoride to each mole of acetylene with a porous activated charcoal supported metal halide catalyst at a temperature of from about 25° C. to about 50° C. and under a pressure below the condensation pressure of hydrogen fluoride at that temperature, said catalyst being the product obtained by distributing an anhydrous metal chloride of the group consisting of stannic chloride and titanium tetrachloride on activated charcoal in a proportion equal to from about 15% to about 25% by weight of metal based on the charcoal and treating the supported metal chloride with substantially pure hydrogen fluoride for at least about 30 minutes at a temperature of from about 0° C. to about 75° C.

8. The process for making 1,1-difluoroethane which comprises contacting a mixture of substantially pure gaseous hydrogen fluoride and gaseous acetylene free of catalyst poisons in a ratio of from about 1.5 to about 3 moles of hydrogen fluoride to each mole of acetylene with a porous carbon supported stannic halide catalyst at a temperature of from about 25° C. to about 75° C. and under a pressure below the condensation pressure of hydrogen fluoride at that temperature, said catalyst being the product obtained by distributing anhydrous stannic chloride on a porous carbon support in a proportion equal to from about 10% to about 40% by weight of tin based on the carbon support and treating the supported stannic chloride with substantially pure hydrogen fluoride for at least about 30 minutes at a temperature of from about 0° C. to about 75° C.

9. The process for making 1,1-difluoroethane which comprises contacting a mixture of substantially pure gaseous hydrogen fluoride and gaseous acetylene free of catalyst poisons in a ratio of from about 1.5 to about 3 moles of hydrogen fluoride to each mole of acetylene with a porous activated charcoal supported stannic halide catalyst at a temperature of from about 25° C. to about 50° C. and under a pressure below the condensation pressure of hydrogen fluoride at that temperature, said catalyst being the product obtained by distributing anhydrous stannic chloride on activated charcoal in a proportion equal to from about 15% to about 25% by weight of tin based on the charcoal and treating the supported stannic chloride with substantially pure hydrogen fluoride for at least about 30 minutes at a temperature of from about 0° C. to about 75° C.

10. The process for making 1,1-difluoroethane which comprises contacting a mixture of substantially pure gaseous hydrogen fluoride and gaseous acetylene free of catalyst poisons in a ratio of from about 1.5 to about 3 moles of hydrogen fluoride to each mole of acetylene with a porous carbon supported titanium halide catalyst at a temperature of from about 25° C. to about 75° C. and under a pressure below the condensation pressure of hydrogen fluoride at that temperature, said catalyst being the product obtained by distributing anhydrous titanium tetrachloride on a porous carbon support in a proportion equal to from about 10% to about 40% by weight of titanium based on the carbon support and treating the supported titanium tetrachloride with substantially pure hydrogen fluoride for at least about 30 minutes at a temperature of from about 0° C. to about 75° C.

11. The process of making a 1,1-difluoroethane which comprises contacting a mixture of substantially pure gaseous hydrogen fluoride and gaseous acetylene free of catalyst poisons in a ratio of from about 1.5 to about 3 moles of hydrogen fluoride to each mole of acetylene with a porous activated charcoal supported titanium halide catalyst at a temperature of from about 25° C. to about 50° C. and under a pressure below the condensation pressure of hydrogen fluoride at that temperature, said catalyst being the product obtained by distributing anhydrous titanium tetrachloride on activated charcoal in a proportion equal to from about 15% to about 25% by weight of titanium based on the charcoal and treating the supported titanium tetrachloride with substantially pure hydrogen fluoride for at least about 30 minutes at a temperature of from about 0° C. to about 75° C.

References Cited in the file of this patent

UNITED STATES PATENTS

| | | |
|---|---|---|
| 2,118,901 | Soll | May 31, 1938 |
| 2,439,299 | Hovey et al. | Apr. 6, 1948 |
| 2,495,407 | Chapman et al. | Jan. 24, 1950 |
| 2,522,687 | Padgitt et al. | Sept. 19, 1950 |
| 2,716,143 | Skiles | Aug. 23, 1955 |

U. S. DEPARTMENT OF COMMERCE

PATENT OFFICE

CERTIFICATE OF CORRECTION

Patent No. 2,830,101     Frederic W. Swamer     April 8, 1958

It is hereby certified that error appears in the printed specification of the above numbered patent requiring correction and that the said Letters Patent should read as corrected below.

Column 5, line 21, for "urged" read --purged--; column 8, line 65, for "of making a" read --for making--.

Signed and sealed this 24th day of June 1958.

(SEAL)
Attest:

KARL H. AXLINE
Attesting Officer

ROBERT C. WATSON
Commissioner of Patents